(No Model.)
R. R. STONE.
MILK REFRIGERATOR.
No. 330,751. Patented Nov. 17, 1885.
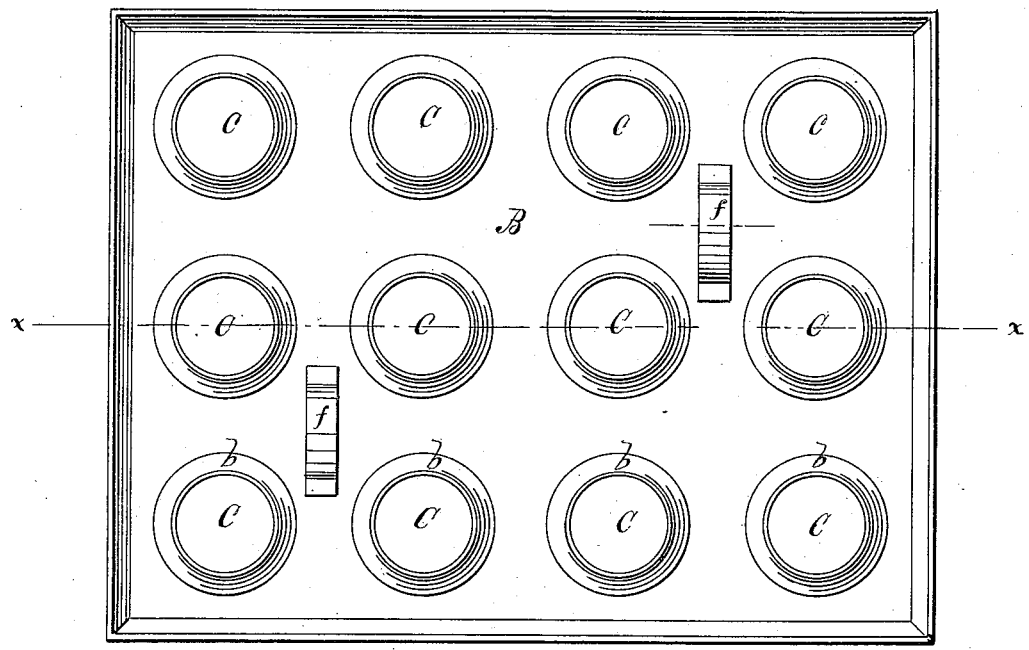
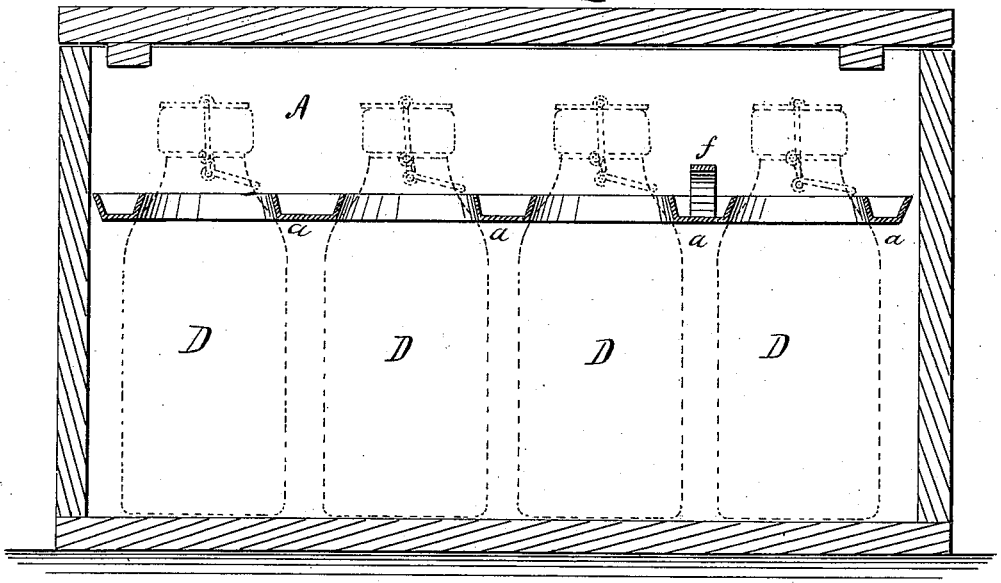
WITNESSES
Chas. Nidh.
D. A. Carpenter
INVENTOR
Reuben R. Stone
By his Attorney

UNITED STATES PATENT OFFICE.

REUBEN R. STONE, OF NEW YORK, N. Y.

MILK-REFRIGERATOR.

SPECIFICATION forming part of Letters Patent No. 330,751, dated November 17, 1885.

Application filed March 17, 1885. Serial No. 159,165. (No model.)

*To all whom it may concern:*

Be it known that I, REUBEN R. STONE, of the city, county, and State of New York, a citizen of the United States, have invented new and useful Improvements in Milk-Refrigerators; and I declare the following to be a full, clear, and exact description of the same, reference being had to the accompanying sheet of drawings, forming part of this specification.

The invention is in the nature of a device for refrigerating milk in bottles; and the invention consists in the device hereinafter shown, described, and claimed.

In the accompanying sheet of drawings, Figure 1 is a plan or top view of my device; Fig. 2, a cross-section of same, taken in line *x x*, Fig. 1.

Similar letters of reference indicate like parts in both figures.

The purpose of this invention is to provide a refrigerating-receptacle in which bottled milk may be safely transported without danger of souring; and the device consists, simply, of a box-shaped receptacle, A, of wood or metal, and of any convenient size or form, but deep enough to receive within it the bottles containing the fluid to be refrigerated, so that the tops of these bottles will be somewhat below the upper edge of the receptacle, as shown in Fig. 2. A diaphragm, B, of sheet metal and of such dimensions as will enable it to be received within the receptacle A, has formed in it a series of circular openings, C, of a diameter that will permit the necks of the bottles D to protrude through the openings and permit the diaphragm to rest on the shoulders *a* of the bottles. Around each opening C is a flange or curb, *b*, which projects to some extent above the upper surface of the diaphragm B.

Now, when my refrigerating device is constructed substantially as described, it is operated by placing the bottles B within the receptacle A, inserting the diaphragm B, so that the neck of each bottle will protrude through its corresponding aperture C in the diaphragm B, and the diaphragm be supported on the shoulders *a* of the bottles. Broken ice is now placed on the diaphragm B and around the protruding necks of the bottles D, and, the receptacle then being closed by a suitable lid, E, the operation is completed. The philosophy of this operation is that the cream in the milk within the bottles rises to the top of the bottle within its neck, and this cream is the first to become soured, and the souring of the milk quickly follows, from the acidity of the cream, so that if this cream is kept sweet the milk will remain sweet. Therefore the ice is placed only around the necks of the bottles in small quantities, which effectually preserves the milk without danger of freezing the milk by surrounding the bottles entirely with ice, and saving the expense and weight that would follow such a process. As the ice melts around the necks of the bottles, the flanges or curbs *b* cause a certain amount of cold water to remain with the ice around the necks of the bottles, and so assist in the refrigerating process, any surplus water that may be formed being allowed to escape between the curbs and the necks of the bottles and trickle over the entire surfaces of the bottles, tending to keep the entire body of the milk cool. The diaphragm B is lifted in and out of the receptacle A by handles *f*. The diaphragm B may be supported within the receptacle in any desirable manner, but the simplest is that which I have described of permitting it to rest on the shoulders of the bottles.

Having now described my invention, what I claim as new, and desire to secure by Letters Patent, is—

1. A milk-refrigerating contrivance consisting of a receptacle, A, containing bottles D and a diaphragm, B, with perforations C and curbs *b*, surrounding the same, whereby said diaphragm may be placed within the receptacle A and be supported on the shoulders *a* of the bottles D, as and for the purpose described.

2. In a refrigerating contrivance, a receptacle for containing bottles and a removable diaphragm suitably supported within said receptacle, and with perforations to admit the necks of the bottles, as and for the purpose described.

REUBEN R. STONE.

In presence of—
G. M. PLYMPTON,
D. A. CARPENTER.